Figure 1:
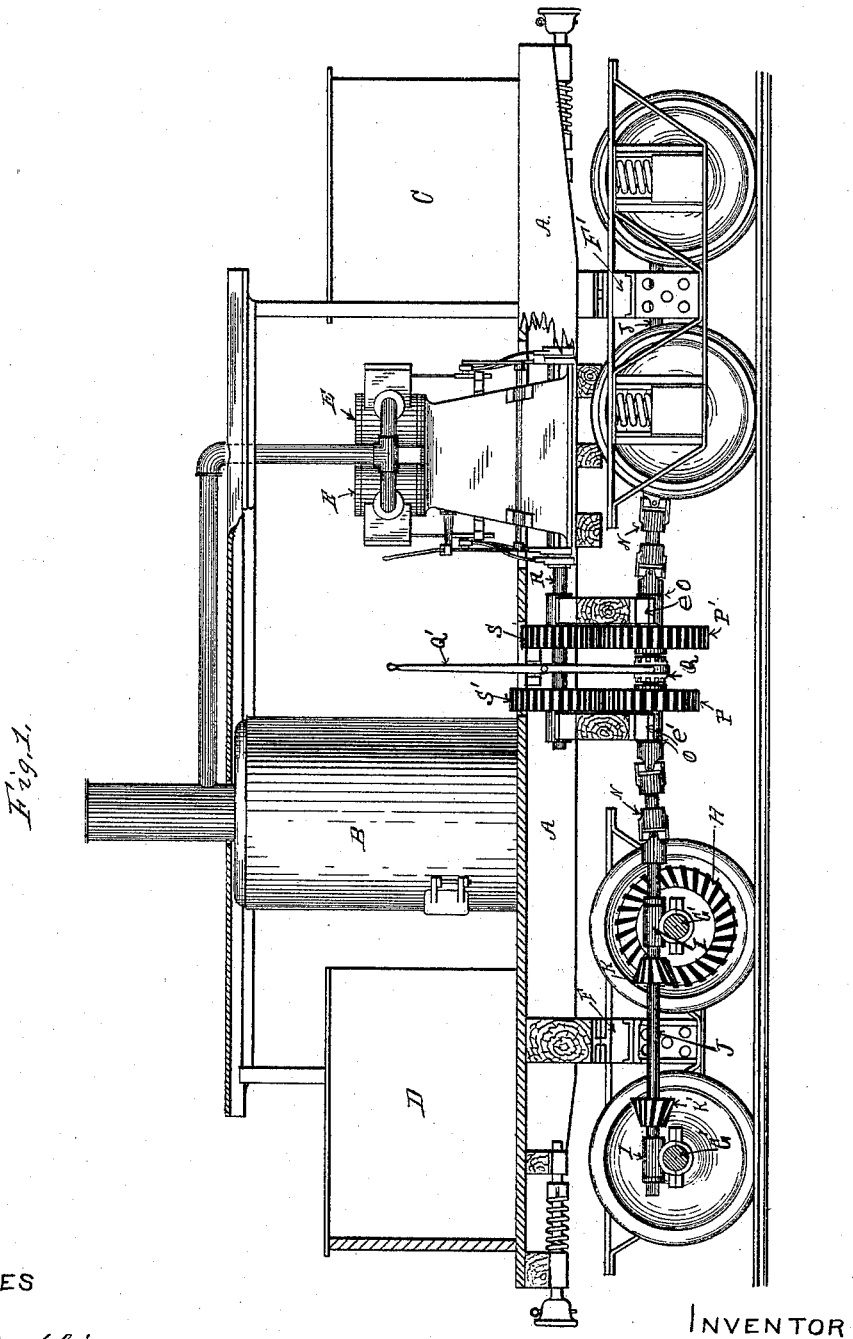

(No Model.) 2 Sheets—Sheet 1.

C. D. SCOTT.
PROPELLING GEAR FOR TRAMWAY LOCOMOTIVES.

No. 488,484. Patented Dec. 20, 1892.

WITNESSES
J.L.Dobbins.
A. L. Jackson

INVENTOR
Charles D. Scott

By his Atty.

(No Model.) 2 Sheets—Sheet 2.
C. D. SCOTT.
PROPELLING GEAR FOR TRAMWAY LOCOMOTIVES.
No. 488,484. Patented Dec. 20, 1892.
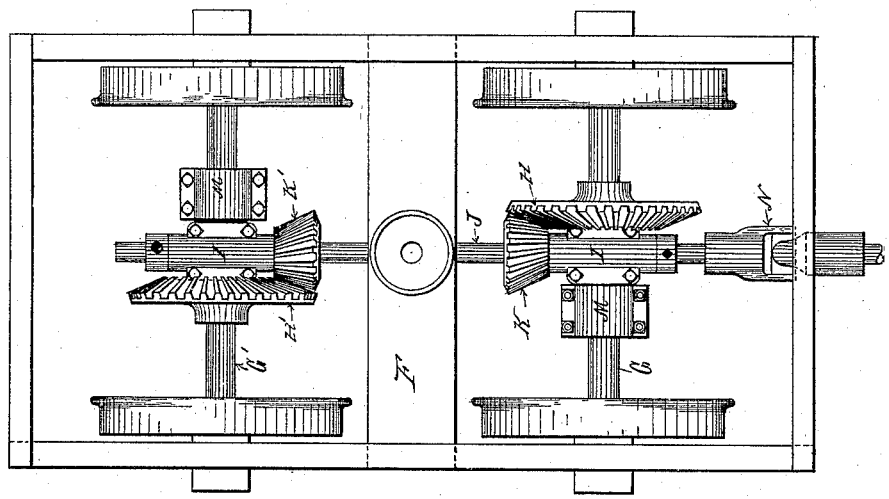
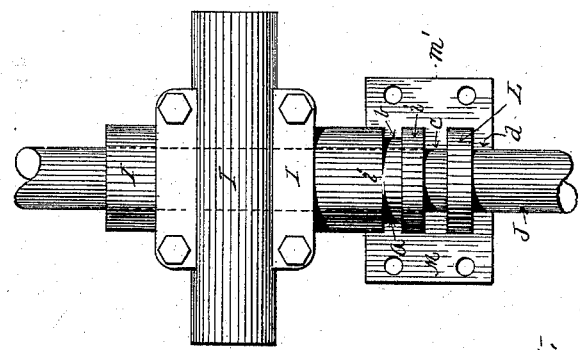
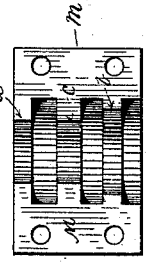
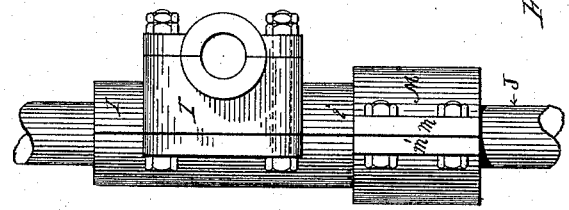
WITNESSES
A. D. Dobbins.
A. L. Jackson
INVENTOR
Charles D. Scott
By his Atty.

UNITED STATES PATENT OFFICE.

CHARLES D. SCOTT, OF SANFORD, PENNSYLVANIA.

PROPELLING-GEAR FOR TRAMWAY-LOCOMOTIVES.

SPECIFICATION forming part of Letters Patent No. 488,484, dated December 20, 1892.

Application filed March 2, 1891. Serial No. 383,504. (No model.)

*To all whom it may concern:*

Be it known that I, CHARLES D. SCOTT, a citizen of the United States, residing at Sanford, in the county of Warren and State of Pennsylvania, have invented certain new and useful Improvements in Propelling-Gear for Tramway-Locomotives; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in propelling gear for tramway locomotives hereinafter set forth and explained, and illustrated in the accompanying drawings, in which:

Figure 1 is a side elevation, partially in section, of a tramway locomotive embodying my improved propelling gear. Fig. 2 is a top or plan view of one of the locomotive trucks, embodying my invention. Figs. 3, 4 and 5 are detail views of parts of same.

The objects of my invention are: First, to construct a tramway locomotive having all of the wheels thereof actuated by gearing, from a central longitudinal shaft. Second, to gear the axles of each of the trucks of such locomotive together by means of short longitudinal shafts mounted in cross boxes journaled upon and supported by said axles, said longitudinal shafts having beveled skew gear wheels thereon, intermeshing with beveled skew gear wheels secured to said axles so as to actuate them. Third, to connect these longitudinal shafts on the front and rear trucks of the locomotive together by means of a central longitudinal shaft mounted on the locomotive frame and geared to the engine by means of flexible couplings so as to impart power to the wheels and at the same time allow of the trucks to turn freely on their king-bolts, when the locomotive is passing around curves. Fourth, to secure the cross boxes from longitudinal movement on the axles by means of adjustable sleeves adapted to engage with fixed collars on the axles, and with gears or collars on the ends of said cross boxes.

Other features of my invention will appear hereinafter in the specification and claims.

In the construction of my invention shown in the drawings A is the locomotive frame; B the boiler; C the water tank and D the coal and wood box. Upon the frame A, I mount a pair of upright reversible engines E E, all of these parts being of usual and ordinary construction.

Under the ends of the locomotive frame A, I place trucks F and F' connected to said frame A by means of king bolts in the usual manner; upon the central portions of the axles G and G' of each of these trucks I secure large beveled skew-gear wheels H, H', and upon the truck axles adjacent to the hubs of said skew-gear wheels I place cross boxes I having two shaft openings therein one at right angles to the other; through the lower of these openings, the truck axles pass, the upper one receiving and supporting longitudinal shafts J upon which are secured beveled skew-gear pinions K, K', intermeshing with the large bevel skew-gear wheels H on the axles G and G'.

To prevent lateral movement of the cross boxes I and I' on the axles G and G', I secure collars thereon preferably as follows: I weld or shrink collars L on the axles G and G' a short distance from the outer ends of the portions *i* of said cross boxes I; I also turn annular grooves *a* in the outer ends of said portions *i* of the cross boxes I. I then provide a sleeve M composed of two half sections *m* and *m'* which are provided with an inwardly projecting rib *b* adapted to fit into the groove *a* in the box, a like rib *c* to occupy the space between the end of the box and the collar L, and a like rib *d* adapted to engage with the outer side of the collar L on the axle, so that when clamped in place thereon the cross box is firmly held from any longitudinal movement on the axle, thus at all times insuring the proper intermeshing of the beveled skew-gears thereon with the beveled skew-gear pinions on the shafts J.

On the inner ends of the shafts J adjacent to the ends of the bearings on the cross boxes I, I secure to the shafts J and J' flexible universal joint couplings N, to which couplings I secure an intermediate longitudinal shaft O, mounted in bearings *e e'* on the locomotive frame A, so that the trucks F and F' can turn freely upon their king bolts sufficiently to pass around any desired curvature in the track upon which the locomotive is operated.

Upon the shaft O between the bearings e e', I place two loose gear wheels P and P', of different size, between which I place a clutch Q adapted to engage with either one of the wheels P or P' as may be desired, by moving a handle Q' communicating with said clutch Q, and on the main or crank shaft R of the engines E E, I secure gear wheels S and S', of different size, adapted to intermesh with and drive the gear wheels P and P' on the shaft O, so that by moving the clutch Q so as to engage with the gear wheel P the shaft O is driven at a slower speed than that of the main or crank shaft R and by moving the clutch Q so as to engage with the gear wheel P' the shaft O is driven at a greater speed than that of the main or crank shaft R. The object of this construction being to enable the engineer to utilize the slower speed when drawing a heavy load around curves or up grades in the track, and the faster speed when on a straight or level track or when drawing light loads. In connecting the driving power to the central portions of the truck axles and making my couplings adjacent thereto I am enabled to utilize the full power of the engine with the least possible loss in going around curves in the track in either direction.

In the construction shown and described I have shown convenient mechanism for utilizing my invention. I do not however confine myself to the exact construction shown and described.

What I claim as new and desire to secure by Letters Patent of the United States is:

1. The combination in a tramway locomotive truck, of beveled skew-gear wheels secured to the axles of said truck, with cross boxes mounted on said axles adjacent to the hubs of said beveled skew-gear wheels, a longitudinal driving shaft mounted in and supported by said cross boxes, and beveled skew-gear pinions on said longitudinal driving shaft intermeshing with the beveled skew-gear wheels on the truck axles, substantially as and for the purpose set forth.

2. The combination in a tramway-locomotive, of trucks, as F and F', supporting a locomotive frame A, beveled skew-gear wheels secured to the axles of said trucks, cross-boxes, as I and I', mounted on the truck axles adjacent to the beveled skew-gears thereon, and collars on the axles to prevent the cross-boxes from moving away from the skew-gear wheels thereon, with longitudinal shafts, as J and J', mounted in said cross boxes and having beveled skew-gear pinions thereon intermeshing with the beveled skew-gear wheels on the truck axles, a longitudinal shaft, as O, mounted in bearings on the locomotive frame, and flexible universal joints connecting the ends of the shaft O to the ends of the shafts J and J', substantially as and for the purpose set forth.

3. The combination in a tramway locomotive truck, of cross boxes I and I' mounted on the axles G and G' of said truck, and collars L secured to said axles adjacent to the ends of said cross boxes thereon, with sleeves M adapted to be clamped over and engage both the end of said cross boxes and the collars on the axles, substantially as and for the purpose set forth.

In testimony whereof I affix my signature in presence of two witnesses.

CHARLES D. SCOTT.

Witnesses:
  S. D. DOBBINS,
  WM. P. HAYES.